United States Patent Office 3,613,419
Patented Oct. 19, 1971

3,613,419
ROLLING MILL AUTOMATIC GAUGE CONTROL
WITH COMPENSATION FOR TRANSPORT TIME
Antonio V. Silva, Buffalo, N.Y., assignor to Westinghouse Electric Corporation, Pittsburgh, Pa.
Filed Aug. 1, 1969, Ser. No. 846,803
Int. Cl. B21b 37/12
U.S. Cl. 72—8
9 Claims

ABSTRACT OF THE DISCLOSURE

Described are a gauge control method and apparatus for a rolling mill wherein the transport time required for the material being rolled to pass from the bite of the rolling mill rolls to a gauge measuring device is compenstated for by means of circuitry having a transfer function which is the inverse of the transfer function of the transport time.

BACKGROUND OF THE INVENTION

In many of the existing control systems for cold rolling mills and the like, a mill screwdown or other actuating device such as a hydraulic cylinder is controlled from a gauge measurement taken several feet beyond the exit side of the mill. The material, after reduction, progresses to the gauge which may be several feet beyond the bite of the mill before any error present in the material thickness can be detected. This distance from the bite of the rolls to the gauge is commonly referred to as "transport distance." The time required for the material to reach the exit gauge is denoted as "transport time," while the time required to measure the strip gauge is usually referred to as "sensing time."

Transport time is a major element in developing error commands. Transport distances of five feet or more are common in most commercial cold rolling equipment available at present, meaning that such a system is not capable of detecting an error in gauge until five feet of material has passed from the bite of the mill rolls. The corrective signal is then transferred to the mill screwdown; or other actuating device; but the measuring gauge does not detect the result of this action until five feet more of the material has passed through the mill. With a high gain system of this type, a natural frequency of oscillation can result; and if this oscillation is left to exist without any attempt to control it, the results are undesirable.

For this reason, the gain of gauge control systems for rolling mills was damped in the past so that the control was very slow, or resort was made to a sampled-type of gauge control system. The latter solution has been generally preferred; although it also has a number of disadvantages. For example, the system is complicated and difficult to calibrate. Furthermore, it cannot correct for fast variations in gauge, especially if these variations are periodic, and in some cases the control system can even make the gauge worse. Since the actual gauge is not continually monitored, the operator must be provided with some type of device to recalibrate the system every time a new material or product with different dimensions is rolled. A "hardness switch" can be supplied for this purpose; but, since there is no straightforward relationship between its position and the product being rolled, this switch is very rarely correctly adjusted.

SUMMARY OF THE INVENTION

As an overall object, the present invention seeks to provide a gauge control method and system for a rolling mill wherein transport time is at least partially compensated for by the use of circuitry, interposed between a gauge error generator and a screwdown or other gauge correcting mechanism, which has a transfer function that is the inverse of the transfer function of the transport time itself.

More specifically, an object of the invention is to provide a gauge control system of the type described wherein the transfer function of the circuitry interposed between the gauge and the rolling mill screwdown is varied as a function of the speed of the material being rolled.

Still another object of the invention is to provide a gauge control system wherein transport time is compensated for by means of a proportional operational amplifier having a feedback path incorporating a variable resistance for producing a transfer function which is approximately the inverse of the transport time transfer function.

Still another object of the invention is to provide a gauge control system of high gain where stability is achieved by a combination of the aforementioned circuitry with a special dead band circuit with hysteresis.

In accordance with the invention, a method and apparatus is provided for controlling a rolling mill gauge determining device, for example a screwdown, controlled in response to an error signal, proportional to deviation in gauge from a desired gauge and is derived through a gauge measuring device positioned beyond the bite of the rolling mill rolls, and wherein the transfer function of the transport time required for the material being rolled to travel from the bite of the mill rolls to the gauge measuring device is approximated by the following expression:

$$\frac{1}{TS+1}$$

where $T$ is the transport time and $S$ is the Laplace variable. Compensation for transport time is accomplished by modifying the error signal from a consideration of the error signal itself and its rate of change. More specifically, the signal is passed through a circuit, preferably an operational amplifier, having a transfer function which is the inverse of the transfer function of the transport time. That is, the transfer function of the operational amplifier is:

$$TS+1$$

In the embodiment of the invention shown herein, the error signal is derived directly from an X-ray gauge which produces an output proportional to deviation in gauge from a desired value. However, if preferred, other and different types of gauges can be used which will produce an output proportional to actual gauge. This actual output gauge signal is compared with a desired gauge signal to produce an error signal which is fed through the compensating circuitry of the present invention to the screwdown or other gauge control mechanism for the rolling mill.

Preferably, the circuitry for modifying the error signal to compensate for transport time comprises an operational amplifier having proportional plus derivative transfer characteristics and a resistance, $R_2$, in its feedback path which varies as a function of the speed (and, consequently, the transport time) of the material issuing from the rolling mill. The transfer function of the operational amplifier is, therefore:

$$-(R_2CS+1)$$

where $C$ is the value of a capacitor connected between the feedback path and ground. This transfer function, it will be seen, is the inverse of the transfer function of the transport time and, hence, compensates for transport time.

The above and other objects and features of the invention will become apparent from the following detailed description taken in connection with the accompanying drawings which form a part of this specification, and in which.

Figure 1:
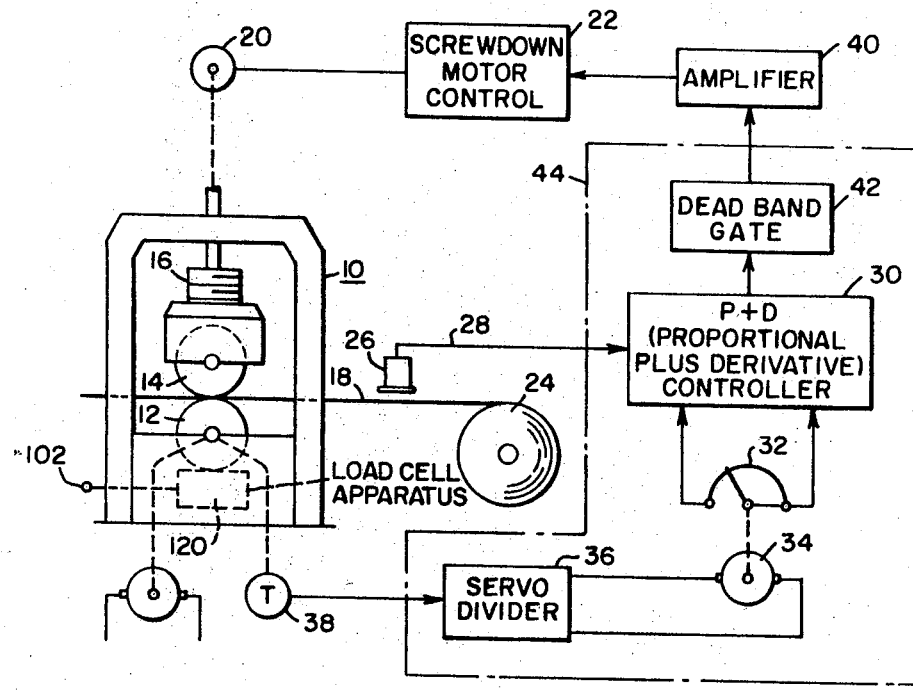
FIG. 1 is a schematic block diagram of the electrical circuitry for controlling a rolling mill in accordance with the teachings of the invention.

With reference now to the drawings, and particularly to FIG. 1, the system shown includes a rolling mill having a housing 10 which carries a lower stationary work roll 12 and an upper movable work roll 14 which can be moved toward or away from the roll 12 by means of a screwdown mechanism, schematically illustrated at 16. Adjustment of the screwdown mechanism 16 will vary the spacing between the rolls 12 and 14 and, hence, vary the gauge of strip material 18 (workpiece) issuing from the mill. The screwdown 16 is controlled by means of a screwdown motor 20 controlled by a motor control circuit 22. After iussing from the rolling mill, the strip material 18 may be wound upon a coiler, schematically illustrated at 24. In the usual case, the rolling mill will consist of a plurality of stands such as that shown in FIG. 1 arranged in tandem; however only one stand is shown herein for purposes of simplicity.

Positioned above the strip material 18 issuing from the rolling mill is a X-ray guage 26 which will produce an output error signal on lead 28 proportional to the deviation in gauge of the strip 18 from a predetermined, desired gauge. It should be understood that gauge 26 is symbolic of detection and comparison with a reference to produce an error signal on line 28. This signal, in turn, is applied to a proportional plus derivative controller 30 in an AGC (automatic gauge control) system 44 where it is modified, depending upon the setting of a potentiometer or rheostat 32 in the AGC circuit. The movable tap on the rheostat 32, in turn, is connected to a servomotor 34 controlled by a servo divider 36 connected to a tachometer generator or the like 38. The tachometer generator 38 is connected as shown to the roll 12 or may be connected to an idler roll over which the strip 18 passes. The function of the servo divider is to drive the rheostat in such a way that the position of the movable tap becomes inversely proportional to the mill speed. In this manner, the output of the tachometer generator 38, which is proportional to the speed of the strip 18, is fed to the servo divider 36 and used to drive the movable tap on potentiometer 32 through servomotor 34. Hence, the position of the movable tap on potentiometer 32 and value of resistance $R_2$ will be inversely proportional to the speed of the strip material and, hence, proportional to the transport time required for a point on the strip to travel from the bite of the rolls 12 and 14 to the position of the X-ray gauge 26. The operation of circuits 30 and 36 will hereinafter be described in greater detail.

A proportional plus derivative controller is conveniently referred to as a $P+D$ controller, and it is a device or arrangement which performs a proportional plus derivative operation on its input signal. Thus a $P+D$ controller provides an output representing the sum of its input and the derivative of its input. Such an operation is conveniently implemented by an operational amplifier having the proper transfer impedance feedback network.

The output of the proportional plus derivative controller 30 is applied to a dead-band gate 42 which prevents any error signals from being fed to the motor control circuit 22 which are very small in magnitude. In this manner, wear on the screws is minimized by preventing movement of the screws for very small errors. The dead-band gate 42, as will be seen, also helps to stabilize the system even though the system can be made stable without any dead-band in the region of interest. The motor control circuit 22 in response to the output of the AGC circuit 44 controls the screwdown motor 20 through amplifier 40 in the proper direction to correct for derivation in workpiece thickness from a desired norm or reference.

Figure 2:
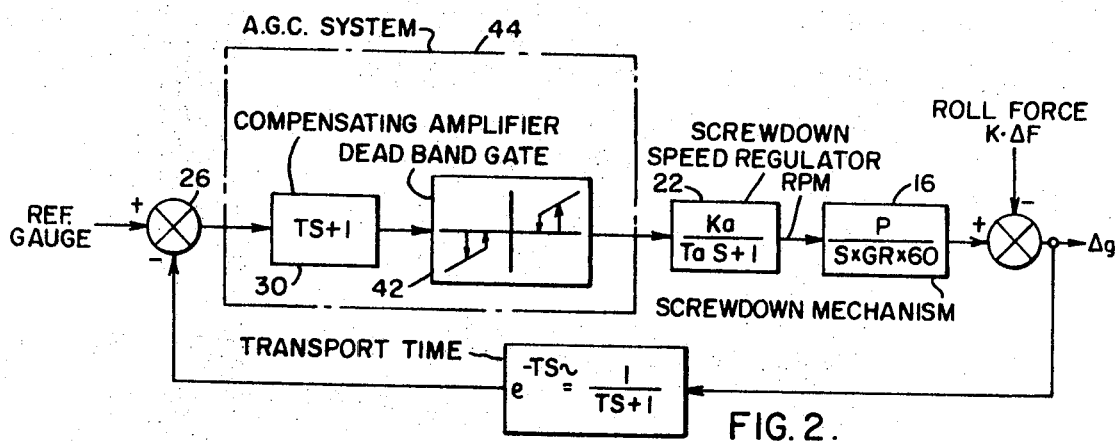
FIG. 2 is a functional block diagram of the rolling mill control system of FIG. 1.

With reference now to FIG. 2, a transfer function block diagram of the servosystem of FIG. 1 is shown. The compensating amplifier 30 is again identified by the reference numeral 30, and the dead-band gate is again identified by the reference numeral 42. The screwdown speed regulator 22 receives a corrective signal from the automatic gauge control system, enclosed by broken lines in FIG. 2 and identified by the reference numeral 44. The transfer function of the speed regulator 22 can be approximated by:

$$\frac{K_a}{T_a S + 1}$$

where $K_a$ is the gain of the speed regulator,
$T_a$ is the time delay of the speed regulator, and
S is the Laplace variable.

The transfer function of the screwdown mechanism is:

$$\frac{P}{S \times GR \times 60}$$

where

P is the pitch of the screw,
S is the Laplace variable, and
GR is the gear ratio of the drive for the screwdown mechanism.

Due to the mill spring, the actual change in gauge is decreased by the amount $K \cdot \Delta F$ (where K is the mill spring constant and $\Delta F$ is the increase in the roll force).

The change in gauge $\Delta g$, is detected by the X-ray gauge 26 only after the strip has moved from the bite of the rolls 12 and 14 to the X-ray measuring head. The time delay involved, T, is the transport time and is inversely proportional to the mill delivery speed. At the gauge 26, the measured gauge is compared with the desired gauge and the difference or error signal is the intelligence fed to the automatic gauge control system 44.

In Laplace transform notation, the transport time is exactly represented by the term $e^{-TS}$ where S is the complex variable. If this transport time transfer function is developed in series we can write:

$$e^{-TS} = \frac{1}{e^{TS}} = \frac{1}{1 + TS + \frac{T^2 S^2}{2!} + \cdots \frac{T^n S^n}{n!}} \simeq \frac{1}{1+TS}$$

(I)

if we ignore the higher order terms. This last approximation is valid for all changes in gauge of a low enough frequency such that the product TW is much greater than $$\frac{T^2 W^2}{2!}$$

(where W is the frequency of gauge variation) for the maximum value of transport time for which the automatic gauge control circuit 30 must operate.

The foregoing equation clearly shows why the automatic gauge control circuit 30 can become unstable at low speeds because of a large lag term. Thus, as shown in FIG. 2, if a circuit having a transfer function $(1+TS)$ is interposed in the system between the dead-band gate and the X-ray gauge, the transport time can be compensated for all frequencies for which the approximation made in the foregoing Equation I is valid.

Figure 3:
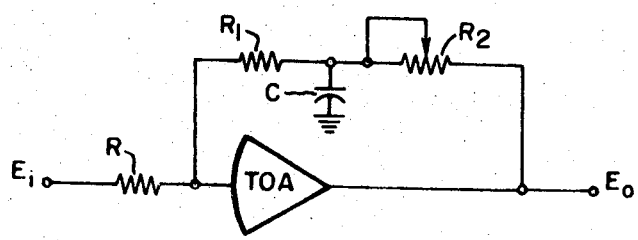
FIG. 3 is an illustration of the operation of the compensating amplifier of the present invention.

Circuitry having a transfer function of $(1+TS)$ is shown in FIG. 3 and includes the operational amplifier TOA having a feedback path including a variable resistor $R_2$ and a resistor $R_1$, the junction of resistors $R_1$ and $R_2$ being connected to ground through capacitor C. The input signal $E_i$ is applied to the input of amplifier TOA through resistor R, while the output is designated as $E_o$. The transfer function of the circuit shown in FIG. 3 is given by:

$$\frac{E_o}{E_i} = -\frac{(R_1+R_2)\left(\frac{R_1R_2}{R_1+R_2}CS+1\right)}{R}$$

and will be recognized as that of a $P+D$ controller. Thus the amplifier TOA with the transfer impedance feedback shown provides the $P+D$ function of controller 30. Now, the resistor $R_1$ is equal to the resistance of resistor R and if the resistance of the respective resistors R and $R_1$ is much greater than that of resistor $R_2$, that is if $R_1 = R \gg R_2$, then:

$$\frac{E_o}{E_i} = -(R_2CS+1)$$

If the product $R_2C$ is made to track the value of transport time T, the compensation required is obtained. The advantage of the amplifier configuration shown in FIG. 3 is that it generates very little noise, when compared with an input-type differentiator, because the input impedance of the amplifier can be made large.

Figure 4:
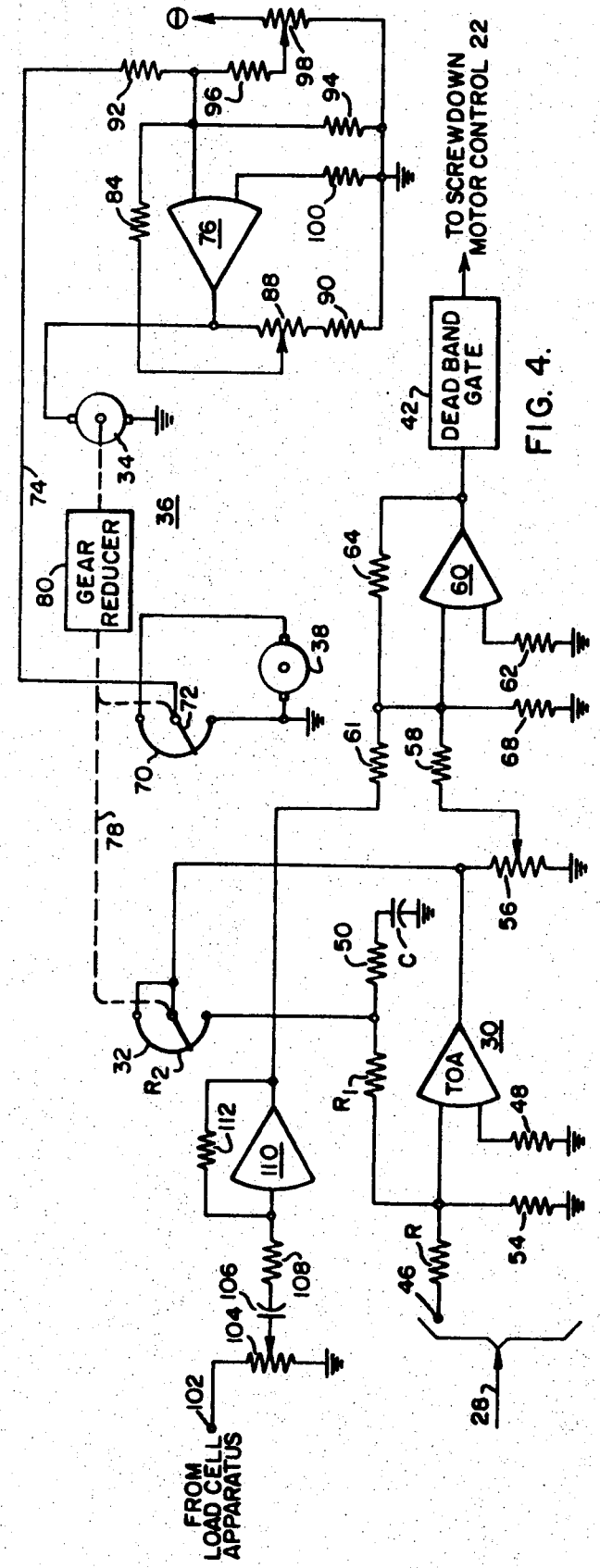
FIG. 4 is a detailed schematic circuit diagram of the compensating circuitry of the invention.

In order to make the quantity $R_2C$ equal to transport time T, it is necessary only to make the value $R_2$ inversely proportional to the mill speed. This is accomplished by the use of a servo divider 36 as shown in FIG. 4 which illustrates implementing ciricuitry for the AGC or compensating ciricuit 44 of FIG. 1. In FIG. 4, the $P+D$ controller 30 incorporates the circuitry of FIG. 3. The output from the X-ray gauge is applied to terminal 46 and through resistor R to one input of operational amplifier TOA, the other input of the amplifier being connected through resistor 48 to ground. TOA is one part of the automatic gauge control ciricuit 30 shown in FIG. 1. One feedback path for the amplifier TOA includes the resistor $R_1$ and the resistor $R_2$ which is in the form of a potentiometer 32, also identified in FIG. 1. The junction of the resistors $R_1$ and $R_2$ is connected through a resistor 50 to capacitor C. A limiting feedback path for the amplifier TOA is provided including the resistor 50; while the summing junction of the operational amplifier is also connected to ground through resistor 54 to balance the input impedances. Output signals from the amplifier are derived from a potentiometer 56 having its movable tap connected through resistor 58 to one input of a second operational amplifier 60. The other input to the operational amplifier is connected to ground through resistor 62. The amplifier 60, which is a proportional amplifier, is provided with a feedback path including resistor 64. The upper input to the amplifier 60 is also connected to ground through resistor 68. The function of amplifier 60 is simply to amplify the output from the $P+D$ controller 30. The resulting output from amplifier 60 is then applied to the dead-band gate 42, also shown in FIG. 1.

The tachometer generator 38 connected to the roll 12 in FIG. 1 is also shown in FIG. 4. It is connected across a potentiometer 70 having its movable tap 72 connected through lead 74 to one input of an operational amplifier 76, forming part of servo divider 36 identified in FIG. 1. The movable tap 72 on potentiometer 70, as well as the movable tap on potentiometer 32, are connected through a common linkage 78 to a gear reducer 80 and thence to a servomotor 34 connected to the output of the operational amplifier 76. The motor driven potentiometer 70 and amplifier 76 are included in the servo divider 36. The operational amplifier 76 is provided with a feedback path including a resistor 84 connected to a movable tap on a rheostat 88 which is in series with resistor 90 between ground and the output of amplifier 76. Input signals on lead 74 are applied to the input of operational amplifier 76 through resistor 92. The summing junction of the amplifier 76 is also connected through resistor 96 to a movable tap on potentiometer 98 connected between ground and a source of negative potential. The other input to the operational amplifier 76 is connected to ground through resistor 100 as shown.

With the arrangement shown, an increase in the speed of the mill, for example, will increase the potential across the potentiometer 70. This, then, causes the output of the operational amplifier 76 to increase, thereby rotating the servomotor 82 and causing the movable tap 72 on potentiometer 70 to move to a position where the net sum of the inputs to the operational amplifier 76 is again reduced to zero. At the same time, the tap on rheostat 32, being interconnected with the tap 72, will also rotate, thereby varying the value of resistance $R_2$ in the feedback path for amplifier TOA. In this manner, it can be seen that when the speed of the mill changes, as does the transport time, the resistance of resistor $R_2$ will also change. Since the transfer function of amplifier TOA is:

$$-(R_2CS+1)$$

or $$\frac{E_o}{E_i} = -(TS+1)$$

any variation in $R_2$ due to a change in mill speed will change the quantity T also. Since the transfer function of the transport time shown in FIG. 1 is also changing, it can be seen that the system is always being compensated regardless of any changes in mill speed.

The position of potentiometer 70 is proportional to $K/V$ where K=a constant and V=mill speed. Potentiometer 98 is adjusted to provide $K/V$ which will track the mill through a desired speed range of the mill, for example from 10% of top mill speed to the top mill speed. K is a constant dependent on the design parameters, associated voltages, top mill speed, and mill speed range within which the AGC system is designed to operate.

It should be noted that in $$\frac{E_o}{E_i} = -(R_2CS+1)$$

the Laplace operator S is transformable to $d/dt$ in the time domain. Thus $E_o = -(R_2CS+1)E_i$ is translatable to $$E_o = -\left(R_2C\frac{d}{dt}+1\right)E_i$$

$$E_o = -\left(R_2C\frac{dE_i}{dt}+E_i\right)$$

From the above it is seen that physically, the compensation provided herein is an approximate reconstruction of the gauge at the roll bite by the reading of the gauge error signal produced by the gauge detector and error generator 26 and a reading of the rate of change of such a signal.

It should be noted that since the system is continuously monitoring gauge, the effect of the mill spring stretch or characteristic appears as a disturbance to the system, analogous to a current load change in a speed regulated drive, and its effect becomes minimized. However, if a more sophisticated automatic gauge control system is desired, this effect can be eliminated by introducing an opposite signal that is a function of roll separation force, for example, proportional to the variation of roll separation force, correctly calibrated, and obtained for example in the well known manner from load cell apparatus symbolically shown at 120 (FIG. 1). Thus, as shown in FIG. 4, a signal from the load cell apparatus is applied to terminal 102 and across potentiometer 104. A movable tap on the potentiometer 104 is connected to a differentiating arrangement including a capacitor 106, a resistor 108 and an operational amplifier 110 having a feedback path including resistor 112. The output of the operational amplifier 110, in turn, is applied to the input of amplifier 60, through resistor 61 along with the output of amplifier TOA in an opposite sense. With the arrangement shown, the load cell signal is differentiated and then added as an input to the amplifier 60. The differentiation is necessary because of the inherent integration introduced by the system. It should be understood, however, that mill spring constant compensation need not necessarily be added because of the continuous closed-loop operation of the system.

Figure 5:
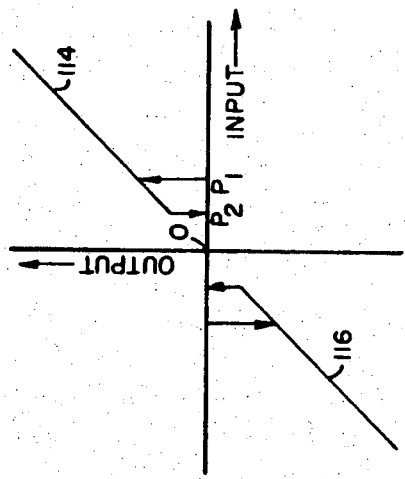
FIG. 5 is a graph illustrating the operation of the dead-band gate of the circuitry of the invention.

As was mentioned above, the function of the deadband gate 42 is to prevent movement of the screwdown mechanism for very small errors. The transfer function of the dead-band gate, which may take the form of various circuit configurations well known to those skilled in the art, is shown in FIG. 5. The output of the deadband gate is a linear function of the input. However, until the input signal reaches point $P_1$, no output is produced. However, at point $P_1$ the output suddenly jumps up such that it is linearly proportional to the input and then increases along the line 114. As the input decreases, however, the output does not drop to zero until point $P_2$ is reached. Operation in the negative region is the same except that the output decreases along line 116.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In the method for controlling a rolling mill gauge determining apparatus of the type in which an error signal proportional to the deviation in gauge of the material being rolled from a desired gauge is derived through a gauge measuring device positioned beyond the bite of the rolling mill rolls, and wherein the transfer function of the transport time required for the material being rolled to travel from the bite of the mill rolls to the gauge measuring device is approximated by:

$$1/TS+1$$

where T is the transport time and S is the Laplace variable; the improvement in said method for controlling said gauge determining apparatus comprising modifying said error signal as a function of the rate of change of said error signal to compensate for said transport time.

2. The method of claim 1 wherein said error signal is modified in accordance with the transfer function $(TS+1)$.

3. The method of claim 2 including the step of measuring the speed of said material being rolled, said error signal being modified as an inverse function of the speed thus measured.

4. The method of claim 3 including the step of modifying said error signal as a function of the mill spring characteristic of said rolling mill.

5. In apparatus for controlling a rolling mill delivery workpiece thickness of the type wherein an error signal proportional to the deviation in gauge of the material being rolled from a desired gauge is derived through a gauge positioned beyond the bite of the rolling mill rolls, and wherein the transfer function of the transport time required for the material being rolled to travel from the bite of the mill rolls to the gauge measuring device is approximated by:

$$1/TS+1$$

where T is the transport time and S is the Laplace variable; the improvement comprising means for producing a signal proportional to the speed of the material being rolled by said rolling mill; and means including a circuit having a transfer function $(TS+1)$ responsive to said signal for modifying said error signal to compensate for said transport time.

6. The apparatus of claim 5 wherein said means for modifying said error signal comprises an operational amplifier having a feedback path including two impedance elements in series, and means for varying the impedance of one of said impedance elements as the speed of said material passing through the rolling mill varies.

7. The apparatus of claim 6 wherein said feedback path includes a pair of resistors in series, a capacitor connecting the junction of said resistors to ground, and means for varying the resistance value of one of said resistors as an inverse function of the speed of said material passing through the rolling mill.

8. The apparatus of claim 7 including a gauge correcting mechanism for said rolling mill, and a dead-band gate connecting the output of said operational amplifier to said gauge connecting mechanism, said dead-band gate preventing signals below a predetermined amplitude from actuating said screwdown mechanism.

9. The combination as in claim 5 wherein said means for modifying said error signal comprises a proportional plus integral controller.

References Cited

UNITED STATES PATENTS

| | | | |
|---|---|---|---|
| 3,045,517 | 7/1962 | Wallace et al. | 72—9 |
| 3,089,365 | 5/1963 | Wallace et al. | 72—237 X |
| 3,266,279 | 8/1966 | Wright | 72—8 |

MILTON S. MEHR, Primary Examiner

U.S. Cl. X.R.

72—16; 318—616, 621